(12) United States Patent
Bok

(10) Patent No.: US 9,817,527 B2
(45) Date of Patent: Nov. 14, 2017

(54) TOUCH SENSING DEVICE

(71) Applicant: Samsung Display Co., Ltd., Yongin, Gyeonggi-Do (KR)

(72) Inventor: Seung Lyong Bok, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 292 days.

(21) Appl. No.: 14/538,625

(22) Filed: Nov. 11, 2014

(65) Prior Publication Data

US 2016/0048237 A1 Feb. 18, 2016

(30) Foreign Application Priority Data

Aug. 18, 2014 (KR) .................. 10-2014-0106970

(51) Int. Cl.
*G06F 3/044* (2006.01)

(52) U.S. Cl.
CPC .................... *G06F 3/044* (2013.01)

(58) Field of Classification Search
CPC ........................................ G06F 3/044
See application file for complete search history.

(56) References Cited

U.S. PATENT DOCUMENTS

| 8,384,691 | B2 | 2/2013 | Frey et al. | |
| 8,586,874 | B2 | 11/2013 | Kuriki | |
| 2009/0267916 | A1 | 10/2009 | Hotelling | |
| 2011/0085122 | A1* | 4/2011 | Fu | G02F 1/13338 349/149 |
| 2011/0273391 | A1* | 11/2011 | Bae | G06F 3/044 345/173 |
| 2012/0228620 | A1* | 9/2012 | Chang | G02F 1/1345 257/59 |
| 2014/0043280 | A1* | 2/2014 | Cok | G06F 3/0412 345/174 |
| 2014/0125883 | A1* | 5/2014 | Chang | G06F 3/044 349/12 |

(Continued)

FOREIGN PATENT DOCUMENTS

| KR | 1020030094599 A | 12/2003 |
| KR | 1020040000778 A | 1/2004 |

(Continued)

*Primary Examiner* — Amr Awad
*Assistant Examiner* — Stephen Bray
(74) *Attorney, Agent, or Firm* — Innovation Counsel LLP

(57) ABSTRACT

A touch sensing device includes an external interconnection region, patch electrodes, and internal interconnections. External interconnections are disposed in the external interconnection region. The patch electrodes are arranged in a first direction away from the external interconnection region. The patch electrodes include a first patch electrode and a second patch electrode. The internal interconnections have first ends connected to the patch electrodes, respectively, and second ends connected to one of the external interconnections. Each of the internal interconnections includes a detour portion, at least one of which at least partially extends away from the external interconnection region, and a main portion, which extends toward the external interconnection region. The detour portion of a first internal interconnection connected to the first patch electrode is longer than the detour portion of a second internal interconnection connected to the second patch electrode.

20 Claims, 10 Drawing Sheets

(56) References Cited

U.S. PATENT DOCUMENTS

| | | | |
|---|---|---|---|
| 2015/0029159 A1* | 1/2015 | Lyle | ........................ G06F 3/044 345/178 |
| 2015/0084201 A1* | 3/2015 | Cok | ....................... G02B 6/138 257/773 |

FOREIGN PATENT DOCUMENTS

| KR | 1020080076519 A | 8/2008 |
|---|---|---|
| KR | 1020100010594 A | 2/2010 |
| KR | 1020110075343 A | 7/2011 |
| KR | 1020120110887 A | 10/2012 |

* cited by examiner

TOUCH SENSING DEVICE

This application claims priority to Korean Patent Application No. 10-2014-0106970 filed on Aug. 18, 2014 in the Korean Intellectual Property Office, the disclosure of which is incorporated herein by reference in its entirety.

BACKGROUND

1. Field

The Application relates to a touch sensing device.

2. Description of the Related Art

As mobile phones equipped with touch screens are widespread and a variety of smart phones become popular, research has been conducted into touch sensing technology. Touch screens, which are touch sensing devices, are classified into resistive touch screens, capacitive touch screens, ultrasonic touch screens and infrared touch screens. Capacitive touch screens, in particular, have continued to expand their field of application because of many advantages such as excellent durability and long lifetime and support of a multi touch function.

In the meantime, as the size of devices to which touch screens can be applied, such as smart phones or notebook computers, increases, the size of touch screens has also increased. However, as the size of touch screens increases, delay variations in the transmission of signals, i.e., resistive-capacitive (RC) delay variations, may become more likely to occur between interconnections for transmitting signals for the detection of a touch location, and as a result, touch screens may not be able to uniformly detect a touch.

SUMMARY

Exemplary embodiments provide a touch sensing device capable of reducing delay variations in the transmission of signals.

However, exemplary embodiments are not restricted to those set forth herein. The above and other exemplary embodiments will become more apparent to one of ordinary skill in the art by referencing the detailed description given below.

According to an exemplary embodiment, there is provided a touch sensing device. The touch sensing device includes an external interconnection region, a plurality of patch electrodes, and a plurality of internal interconnections. A plurality of external interconnections are disposed in the to external interconnection region. The patch electrodes are configured to be arranged in a first direction away from the external interconnection region. The patch electrodes comprise a first patch electrode and a second patch electrode, the second patch electrode being further apart than the first patch electrode from the external interconnection region. The internal interconnections are configured to be disposed in a dead zone, which is defined on one side of the patch electrodes. The internal interconnections having first ends connected to the patch electrodes, respectively, and second ends connected to one of the external interconnections. Each of the internal interconnections includes a detour portion, at least one of which at least partially extends away from the external interconnection region, and a main portion, which extends toward the external interconnection region. The detour portion of a first internal interconnection connected to the first patch electrode is longer than the detour portion of a second internal interconnection connected to the second patch electrode.

According to another exemplary embodiment, there is provided a touch sensing device. The touch sensing device includes: an external interconnection region in which a plurality of external interconnections are disposed; a plurality of patch electrodes configured to be arranged in a first direction away from the external interconnection region; a plurality of internal interconnections configured to be disposed in a dead zone, which is defined on one side of the patch electrodes, the internal interconnections having first ends connected to the patch electrodes, respectively, and second ends to one of the external interconnections; and one or more capacitor electrodes configured to be insulated from, and overlap with the internal interconnections.

According to another exemplary embodiment, there is provided a touch sensing device. The touch sensing device includes: an external interconnection region in which a plurality of external interconnections are disposed; a plurality of patch electrodes configured to be arranged in a first direction away from the external interconnection region; a plurality of internal interconnections configured to be disposed in a dead zone, which is defined on one side of the patch electrodes, the internal interconnections having first ends connected to the patch electrodes, respectively, and second ends to one of the external interconnections; and one or more capacitor electrodes configured to be insulated from, and overlap with the external interconnections.

According to the exemplary embodiments, it is possible to provide a touch sensing device capable of reducing delay variations in the transmission of signals.

Other features and exemplary embodiments will be apparent from the following detailed description, the drawings, and the claims.

BRIEF DESCRIPTION OF THE DRAWINGS

The above and other features of the inventive concept will become more apparent by describing in detail embodiments thereof with reference to the attached drawings in which.

DETAILED DESCRIPTION OF THE EMBODIMENTS

Figure 1:
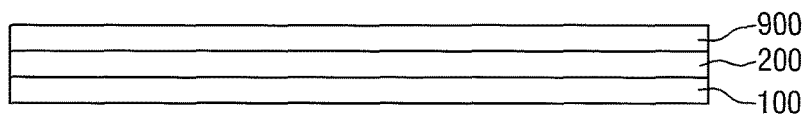
FIG. 1 is a cross-sectional view illustrating a stack structure of a touch sensing device according to an exemplary embodiment.

Features of the inventive concept and methods of accomplishing the same may be understood more readily by reference to the following detailed description of the embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein to interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments will hereinafter be described with reference to the accompanying drawings.

FIG. 1 is a cross-sectional view illustrating a stack structure of a touch sensing device according to an exemplary embodiment.

Referring to FIG. 1, a touch sensing apparatus according to an exemplary embodiment includes a substrate 100 and a conductive pattern layer 200 disposed on the substrate 100, and also includes a window 900 disposed on the conductive pattern layer 200.

The substrate 100 may be formed of a transparent material. In an exemplary embodiment, the transparent material may be tempered glass, an acrylic resin, polyethylene terephthalate (PET), polycarbonate (PC), polyimide (PI), polyether sulfone (PES), polymethyl methacrylate (PMMA), polyethylene naphthalate (PEN), metal foil, fiber reinforced plastic, or silicon rubber. The substrate 100 may be a reinforced substrate or a flexible substrate.

The conductive pattern layer 200 may be disposed on the substrate 100. The conductive pattern layer 200 is a layer including a plurality of conductive patterns, wherein the conductive patterns may be electrodes for touch sensing.

The conductive pattern layer 200 may be optically transparent. The expression "optically transparent", as used herein, not only indicates that the conductive pattern layer 200 is formed of an optically transparent material, but also indicates that the conductive pattern layer 200 is formed of a non-transparent material, but is perceived as transparent to the naked eye because of the non-transparent material is very small in size and is distributed at an appropriate density.

The conductive pattern layer 200 may be formed of a transparent conductive oxide such as indium tin oxide (ITO), indium zinc oxide (IZO), or zinc oxide (ZO), a conductive material such as a carbon nanomaterial, nanowire, or a conductive polymer, a metal particle or metal in the form of a thin film or a mesh, or any combination thereof.

For example, the carbon nanomaterial may include a single-wall carbon nanotube, a multi-wall carbon nanotube, carbon nanoparticles, and graphene.

For example, the nanowire may include a silver (Ag) nanowire, a copper (Cu) nanowire, a gold (Ag) nanowire, a platinum (Pt) nanowire, and a silicon nanowire.

For example, the conductive polymer may include polyethylene dioxythiophene (PEDOT), poly(3,4-ethylenedioxythiophene)polystyrene sulfonate (PEDOT:PSS), poly(3-alkyl)thiophene (P3AT), poly(3-hexyl)thiophene (P3HT), polyaniline (PANI), polyacetylene (PA), polyazulene, polyisothianapthalene (PITN), polyisothianaphthene, polythienylenevinylene, polythiophene (PT), polyparaphenylene (PPP), polyparaphenylene vinylene (PPV), polyphenylene sulfide, polyphenylene, polyfuran, polypyrrole (PPY), and polyheptadiyne (PHT).

For example, the mesh-type metal particle or metal may include Ag, aluminum (Al), Cu, chromium (Cr), and nickel (Ni).

The conductive patterns may be provided in various forms. For example, the conductive patterns may be provided as sensing and/or driving electrodes such as patch electrodes (not illustrated) or column electrodes (not illustrated) or as external or internal interconnections (not illustrated).

The transparent window 900 may be disposed on the conductive pattern layer 200. The transparent window 900 may form and maintain the exterior of an input unit of the touch sensing device. The transparent window 900 may be exposed, at least partially, to the outside of the touch sensing device, and may thus receive touch input from a conductive object such as part of a user's body or a stylus pen. The transparent window 900 may protect the conductive patterns of the conductive pattern layer 200. In an exemplary embodiment, the transparent window 900 may be coupled to the substrate 100 and the conductive pattern layer 200 by a transparent adhesive (not illustrated), but the embodiments are not limited thereto. In another exemplary embodiment, the transparent window 900 and the transparent adhesive may not be provided.

Figure 2:
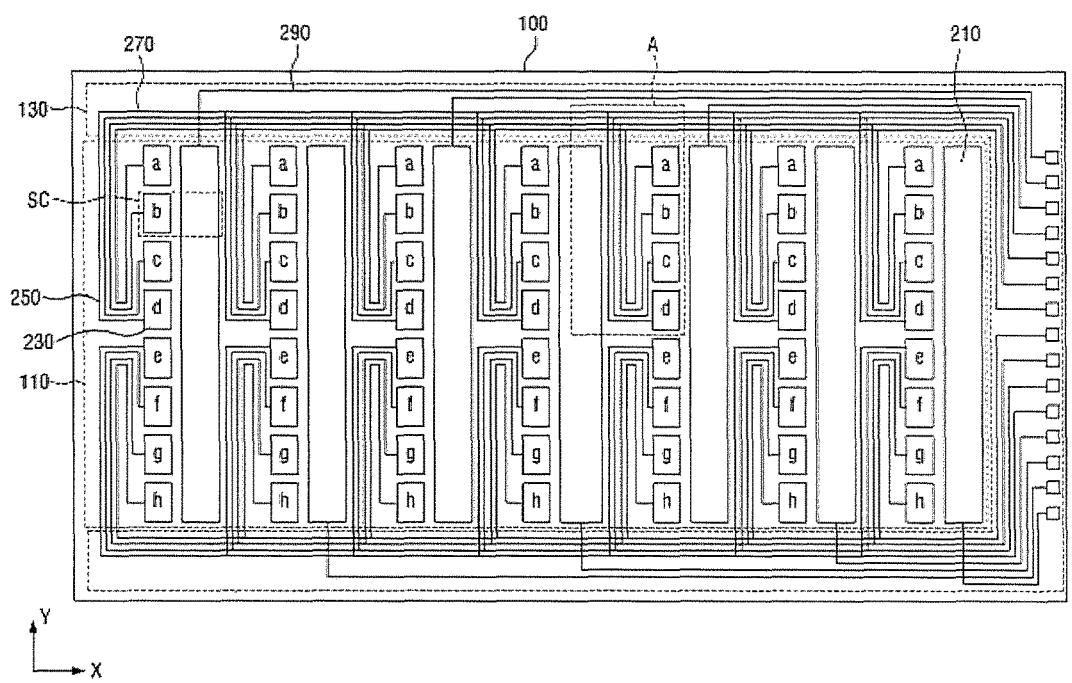
FIG. 2 is a plan view illustrating a planar structure of the touch sensing device according to an exemplary embodiment.

FIG. 2 is a plan view illustrating a planar structure of the touch sensing device according to an exemplary embodiment.

Referring to FIG. 2, the substrate 100 includes a touch sensing region 110 and an external interconnection region 130, which is provided outside the touch sensing region 110.

In the touch sensing region 110, which is a region for detecting input information such as touch input or gesture input from the user, a plurality of column electrodes 210, a plurality of patch electrodes 230 and a plurality of internal interconnections 250 may be provided.

In the external interconnection region 130, which surrounds the touch sensing region 110, a plurality of first external interconnections 270 and a plurality of second external interconnections 290 transmitting sensing signals generated in the touch sensing region 110 may be provided. For convenience, the touch sensing region 110 and the external interconnection region 130 are illustrated as being separate from each other, but the inventive concept is not limited thereto. That is, the touch sensing region 110 and the external interconnection region 130 may be incorporated into a single region, or the external interconnection region 130 may also be configured to detect input information from the user.

More specifically, in the touch sensing region 110, a plurality of electrodes, which are transparent conductive patterns, may be provided. The plurality of electrodes may include the column electrodes 210 and the patch electrodes 230.

The column electrodes 210 may extend in a first direction (or a Y-axis direction). For convenience, the column electrodes 210 are illustrated in FIG. 2 as being bar-shaped, but the inventive concept is not limited thereto. That is, the column electrodes 210 may be formed in various shapes, other than a bar shape, extending in the first direction (or the Y-axis direction). In an exemplary embodiment, the column electrodes 210 may be used as sensing electrodes for sensing a touch, but the embodiments are not limited thereto. That is, the column electrodes 210 may be used as driving electrodes.

The column electrodes 210 may be electrically connected to the second external interconnections 290, respectively. More specifically, the second external interconnections 290 may be electrically connected to the column electrodes 210, respectively, and may transmit signals sensed by the column electrode 210 to a controller (not illustrated) or transmit driving signals applied by the controller to the column electrodes 210. The second external interconnections 290 may be disposed in the external interconnection region 130, but the inventive concept is not limited thereto. That is, at least some of the second external interconnections 290 may be disposed in the touch sensing region 110.

The patch electrodes 230 may be disposed adjacent to the column electrodes 210, and may be arranged in lines along the first direction (or the Y-axis direction) to form a plurality of patch electrode columns. The patch electrode columns are illustrated in FIG. 2 as each having a total of eight patch electrodes 230 belonging to a-th to h-th rows, respectively, but the inventive concept is not limited thereto. That is, the number of patch electrodes 230 included in each of the patch electrode columns may vary. The patch electrode columns are also illustrated in FIG. 2 as being disposed on the left side of their respective column electrodes 210, but the inventive concept is not limited thereto. The patch electrodes 230 included in each of the patch electrode columns may be physically isolated from each other, and may be arranged in a row at a uniform pitch. Assuming that a column electrode 210 and a patch electrode column adjacent to the column electrode 210 form an electrode pair, a plurality of electrode pairs may be provided side-by-side along a second direction (or an X-axis direction) in the touch sensing region 110.

A dead zone may be defined on one side of each of the patch electrode columns. The dead zones may be regions where neither the patch electrodes 230 nor the column electrodes 210 are provided and as a result, no input can be directly detected. The dead zones may extend in the first direction (or the Y-axis direction) in a similar manner to the column electrodes 210.

The dead zones and the column electrodes may be on the opposite sides of their respective patch electrode columns. For example, a column electrode 210, a patch electrode column (or an array of patch electrodes 230 in the first direction) and a dead zone may be sequentially and repeatedly arranged along the second direction (or the X-axis direction). For example, in response to the column electrodes 210 being disposed on the right side of their respective arrays of the patch electrodes 230 in the first direction (or the Y-axis direction) or their respective patch electrode columns, as illustrated in FIG. 2, the dead zones may be disposed on the left side of their respective patch electrode columns. Alternatively, in response to the column electrodes 210 being disposed on the left side of their respective patch electrode columns, the dead zones may be disposed on the right side of their respective patch electrode columns. However, the embodiments are not limited to the example illustrated in FIG. 2. That is, the locations of the dead zones may vary, if necessary.

The internal interconnections 250 may be provided in the dead zones. The internal interconnections 250 may transmit signals sensed by the patch electrodes 230 to the controller or transmit driving signals applied by the controller to the patch electrodes 230. First ends of the internal interconnections 250 may be connected to the patch electrodes 230, and second ends of the internal interconnections 250 may be connected to the first external interconnections 270. The internal interconnections 250 will be described later in detail.

In an exemplary embodiment, one patch electrode 230 may be paired with a corresponding part of a column electrode 210 adjacent thereto (i.e., the part of the column electrode 210 directly facing the patch electrode 230 in the second direction or the X-axis direction) to form a unit sensing region SC. For example, one patch electrode 230 may be paired with a corresponding part of a column electrode 210 on the right side thereof to form a unit sensing region SC.

In this manner, a plurality of unit sensing regions SC may be arranged in a matrix form. For example, as illustrated in FIG. 2, eight rows of patch electrodes 230 may be provided along the first direction (or the Y-axis direction), and seven column electrodes 210 and seven columns of patch electrodes 230 may be arranged along the second direction (or the X-axis direction). In this example, the plurality of unit sensing regions SC may form a 7×8 matrix. However, the embodiments are not limited to this example. That is, the number and the arrangement of unit sensing regions SC may vary.

In the external interconnection region 130, the first external interconnections 270 and the second external interconnections 290 may be provided. The first external interconnections 270 and the second external interconnections 290 may extend in the second direction (or the X-axis direction) in parallel to one another. The first external interconnections 270 and the second external interconnections 290 may be connected to the controller. The first ends of the internal interconnections 250 may be connected to the patch electrodes 230, and the second ends of the internal interconnections 250 may be connected to the first external interconnections 270. Different patch electrodes 230 may be connected by different internal interconnections 250. The second ends of internal interconnections 250 connected to patch electrodes 230, respectively, in the same row may be connected to the same first external interconnection 270. On the other hand, the second ends of internal interconnections 250 connected to patch electrodes 230, respectively, in different rows may be connected to different first external interconnections 270.

Internal interconnections 250 connected to the same patch electrode column may be physically isolated from each other without intersecting or meeting each other. For this, an internal interconnection 250 connected to a patch electrode 230 in an upper row (for example, the a-th row) may be located more inwardly than an internal interconnection 250 connected to a patch electrode 230 in a more distant row (for example, the b-th row) from the external interconnection region 130. That is, an internal interconnection 250 connected to a patch electrode 230 in a low row may surround an internal interconnection 250 connected to a patch electrode 230 in an upper row.

The internal interconnections 250, the first external interconnections 270 and the second external interconnections 290 may be formed of a conductive material. The conductive material may be a transparent conductive oxide such as ITO, IZO, or ZO, a conductive material such as a carbon nanomaterial, nanowire, or a conductive polymer, a metal particle or metal in the form of a thin film or a mesh, or any combination thereof. In an exemplary embodiment, the internal interconnections 250, the first external interconnections 270 and the second external interconnections 290 may be optically transparent. In an exemplary embodiment, at least one of the internal interconnections 250, the first external interconnections 270 and the second external interconnections 290 may be formed of the same material as at least one of the column electrodes 210 and the patch electrodes 230.

Figure 3:
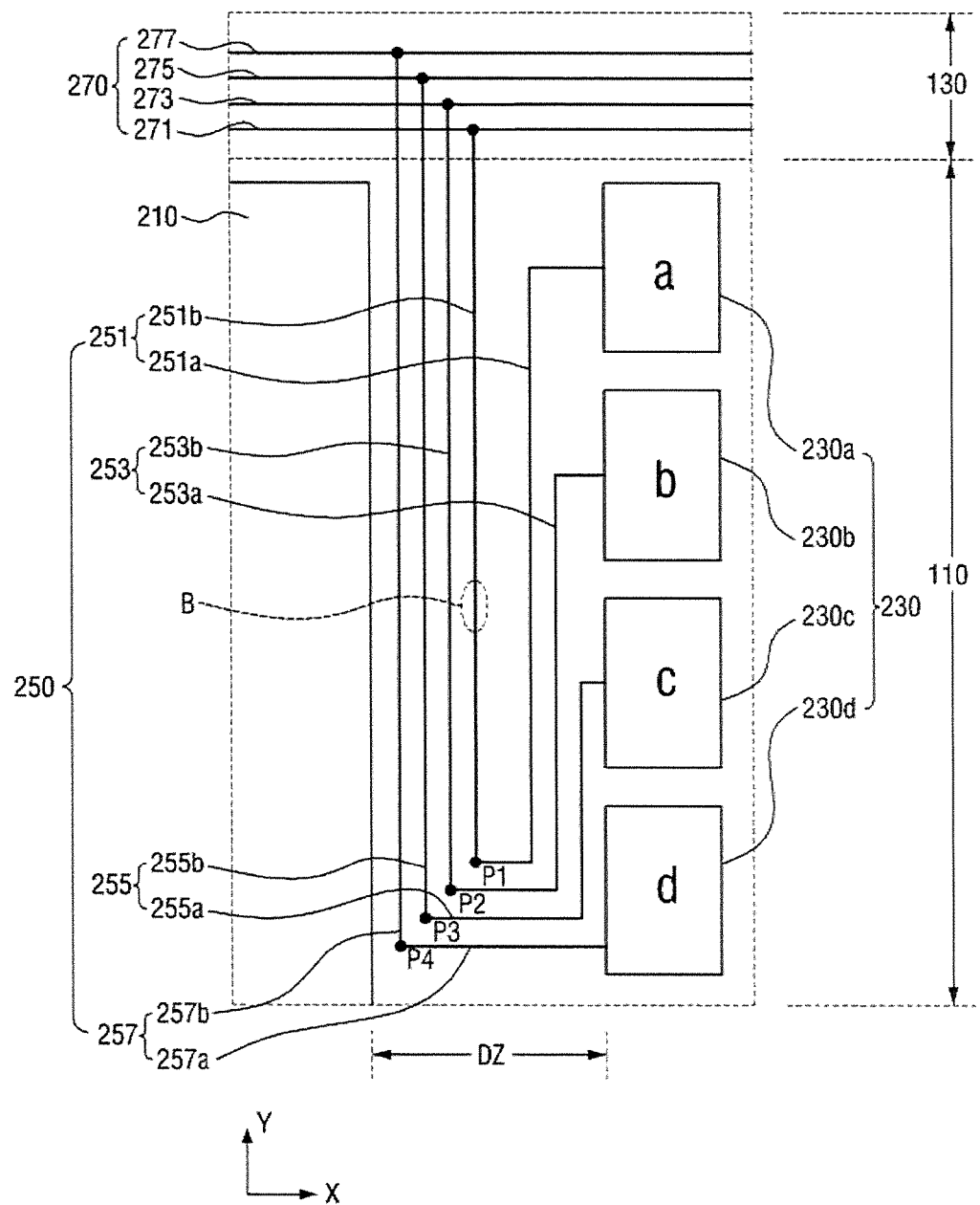
FIG. 3 is an enlarged view of part of the touch sensing device illustrated in FIG. 2.

FIG. 3 is an enlarged view of part of the touch sensing device illustrated in FIG. 2, and particularly, portion A of FIG. 2.

The internal interconnections 250 and the first external interconnections 270 will hereinafter be described with reference to FIGS. 2 and 3.

For convenience, referring to a single patch electrode column, the patch electrode 230 in the a-th row, the patch electrode 230 in the b-th row, the patch electrode 230 in the c-th row, and the patch electrode 230 in the d-th row will hereinafter be referred to as first, second, third, and fourth patch electrodes 230a, 230b, 230c, and 230d, respectively.

Also, for convenience, an internal interconnection 250 connected to the first patch electrode 230a, an internal interconnection 250 connected to the second patch electrode 230b, an internal interconnection 250 connected to the third patch electrode 230c, and an internal interconnection 250 connected to the fourth patch electrode 230d will hereinafter be referred to as first, second, third, and fourth internal interconnections 251, 253, 255, and 257, respectively.

Also, for convenience, a first external interconnection 270 connected to the first internal interconnection 251, a first external interconnection 270 connected to the second internal interconnection 253, a first external interconnection 270 connected to the third internal interconnection 255, and a first external interconnection 270 connected to the fourth internal interconnection 257 will hereinafter be referred to as first, second, third, and fourth sub-external interconnections 271, 273, 275, and 277, respectively. The patch electrodes 230 in a single patch electrode column may have different distances from the external interconnection region 130. That is, the patch electrodes 230 in a single patch electrode column may become more distant from the external interconnection region 130 in alphabetical order of their rows. For example, the second patch electrode 230b in the b-th row may be more distant than the first patch electrode 230a in the a-th row from the external interconnection region 130. Similarly, the third patch electrode 230c in the c-th row may be more distant than the second patch electrode 230b in the b-th row from the external interconnection region 130, and the fourth patch electrode 230d in the d-th row may be more distant than the third patch electrode 230c in the c-th row from the external interconnection region 130. If the internal interconnections 250 are provided in the dead zones DZ to connect the patch electrodes 230 and the first external interconnections 270 with shortest paths, the internal interconnections 250 may have different lengths depending on the locations of the patch electrodes 230 to which they are respectively connected. For example, the internal interconnection 250 connected to the first patch electrode 230a in the a-th row, i.e., the first internal interconnection 251, may be the shortest, and an internal interconnection 250 connected to a patch electrode 230 in a lower row than the first internal interconnection 251 may be longer than the first internal interconnection 251.

If the first, second, third, and fourth internal interconnections 251, 253, 255, and 257 have the same width, their resistance may vary depending on their length, and as a result, variations in resistive-capacitive (RC) delays may occur in the first, second, third, and fourth internal interconnections 251, 253, 255, and 257 because the product of the resistance and capacitance of each internal interconnection 250 is directly associated with a delay in the transmission of a signal. However, due to the RC delay variations, touch input may not be able to be adequately sensed, and the RC delay variations may even serve as noise in the process of detecting touch input.

To prevent the occurrence of RC delay variations, the internal interconnections 250 may connect the patch electrodes 230 and the first external interconnections 270 by making different "detours" from the shortest paths between the patch electrodes 230 and the first external interconnections 270 in consideration of the locations of the patch electrodes 230.

More specifically, the first, second, third, and fourth internal interconnections 251, 253, 255, and 257 may include detour portions 251a, 253a, 255a, and 257a, respectively, which at least partially extend away from the external interconnection region 130, and main portions 251b, 253b, 255b and 257b, respectively, which extend toward the external interconnection region 130.

The first, second, third, and fourth internal interconnections 251, 253, 255, and 257 may be continued from the detour portions 251a, 253a, 255a, and 257a, respectively, to the main portions 251b, 253b, 255b, and 257b, respectively. Connecting nodes between the detour portions 251a, 253a, 255a, and 257a and the main portions 251b, 253b, 255b and 257b may become "most distant" points P1, P2, P3 and P4, i.e., points where the first, second, third, and fourth internal interconnections 251, 253, 255, and 257 are most distant from the external interconnection region 130 in the first direction (or the Y-axis direction). If there are more than two points where each of the first, second, third, and fourth internal interconnections 251, 253, 255, and 257 becomes most distant from the external interconnection region 130 in the first direction (or the Y-axis direction), whichever of the points is most distant from a corresponding patch electrode 230 in the second direction (or the X-axis direction) may be determined to be a most distant point for a corresponding internal interconnection 250.

In an exemplary embodiment, the main portions 251b, 253b, 255b, and 257b may extend from the most distant points P1, P2, P3, and P4, respectively, without making any detours. That is, the main portions 251b, 253b, 255b, and 257b may be formed as straight lines.

The detour portions 251a, 253a, 255a, and 257a may extend from the first, second, third, and fourth patch electrodes 230a, 230b, 230c, and 230d, respectively, to the most distant points P1, P2, P3, and P4, respectively. The distances from the external interconnection region 130 to the ends of the first, second, third, and fourth internal interconnections 251, 253, 255, and 257 may be respectively greater than the distances from the external interconnection region 130 to the most distant points P1, P2, P3, and P4. Accordingly, the detour portions 251a, 253a, 255a, and 257a may have parts extending away from the external interconnection region 130. The detour portions 251a, 253a, 255a, and 257a do not necessarily have to extend away from the external interconnection region 130 as a whole. For example, the detour portions 251a, 253a, 255a, and 257a may have parts extending in the second direction (or the X-axis direction). Even though not specifically illustrated in FIG. 3, the detour portions 251a, 253a, 255a, and 257a may have parts extending toward the external interconnection region 130, in which case, the parts of the detour portions 251a, 253a, 255a, and 257a that extend away from the external interconnection region 130 may become longer. The detour portion 257a, which is farthest apart from the external interconnection region 130, may only extend in the second direction (or the X-axis direction), instead of having a part extending away from the external interconnection region 130, as illustrated in FIG. 3.

At least one of the detour portions 251a, 253a, 255a, and 257a may have a plurality of straight line sections and one or more bent sections therebetween. The bent sections may be places where the direction in which the detour portions 251a, 253a, 255a, and 257a extend changes. More specifically, as illustrated in FIG. 3, each of the detour portions 251a, 253a, 255a includes two row-directional straight line sections, one column-directional straight line section connecting the two row-directional straight line sections, and two bent sections among the two row-directional straight line sections and the column-directional straight line section. A bent section may also be provided at a place where a detour portion and a main portion of an internal interconnection 250 meet each other.

The detour portion 257a connected to the patch electrode 230 in the d-th row, i.e., the fourth patch electrode 230d, may only include a row-directional straight line section with no bent section.

An internal interconnection 250 (for example, the first internal interconnection 251) connected to a patch electrode 230 in an upper row (for example, the first patch electrode 230a) may be located more inwardly than an internal interconnection 250 (for example, the second internal interconnection 253) connected to a patch electrode 230 in a lower row (for example, the second patch electrode 230b). Accordingly, the length of the main portion (for example, the main portion 251b) of the internal interconnection 250 for the upper row may be shorter than the length of the main portion (for example, the main portion 253b) of the internal interconnection 250 for the lower row. In this case, by making the length of the detour portion (for example, the detour portion 251a) of the internal interconnection 250 for the upper row greater than the length of the detour portion (for example, the detour portion 253a) of the internal interconnection 250 for the lower row, it is possible to make the internal interconnection 250 for the upper row and the internal interconnection 250 for the lower row have the same length. In response to the internal interconnections 250 being adjusted to have substantially the same length, the total resistance of the internal interconnections 250 may become uniform, and as a result, noise that may occur due to irregular RC delays may be prevented.

Figure 4A:
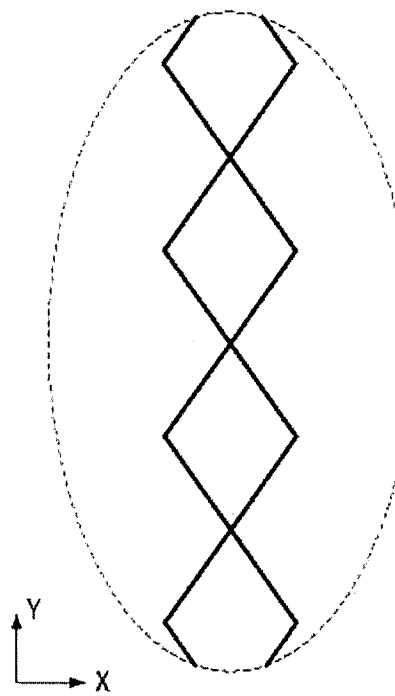
FIG. 4A is an enlarged view of an example of part of the touch sensing device illustrated in FIG. 3.
Figure 4B:
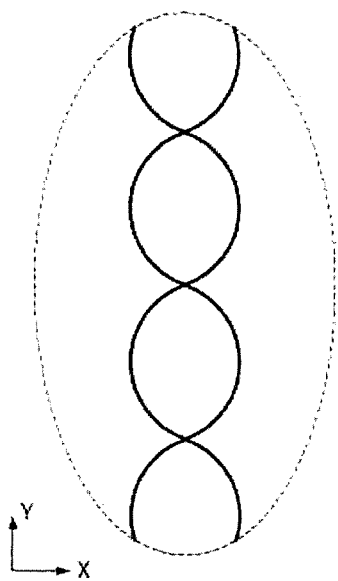
FIG. 4B is an enlarged view of another example of part of the touch sensing device illustrated in FIG. 3.

FIG. 4A is an enlarged view of an example of part of the touch sensing device illustrated in FIG. 3, and particularly, an example of portion B of FIG. 3, and FIG. 4B is an enlarged view of another example of portion B of FIG. 3.

Referring to FIGS. 3 to 4B, each of the internal interconnections 250 may be formed in a mesh form. In an exemplary embodiment, each of the internal interconnections 250 may be formed in a mesh form in which at least two metal lines continue to meet and separate while extending and bending diagonally along the first direction (or the Y-axis direction), as illustrated in FIG. 4A. In this exemplary embodiment, the two metal lines may form a series of rectangles by continuing to meet and separate, but the embodiments are not limited thereto. That is, the two metal lines may form a series of circles or connected circular arcs by continuing to meet and separate, as illustrated in FIG. 4B. In response to each of the internal interconnections 250 being formed in a mesh form, the internal interconnections 250 can be effectively prevented from being visible to the outside of the touch sensing device, and visibility can be improved.

Figure 5:
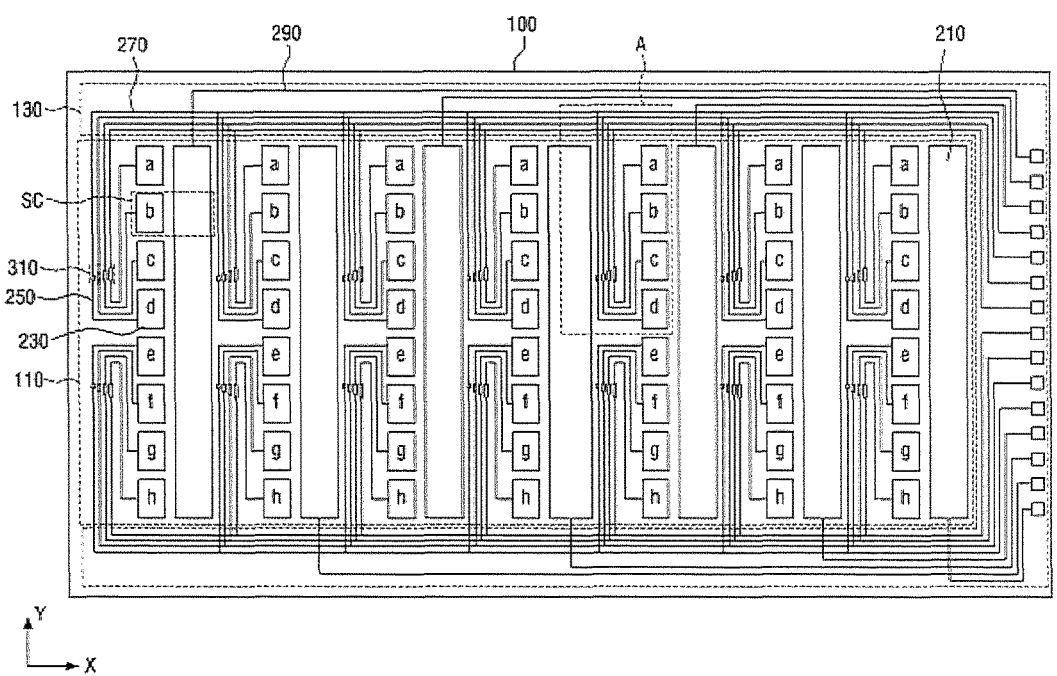
FIG. 5 is a plan view illustrating a planar structure of a touch sensing device according to another exemplary embodiment.
Figure 6:
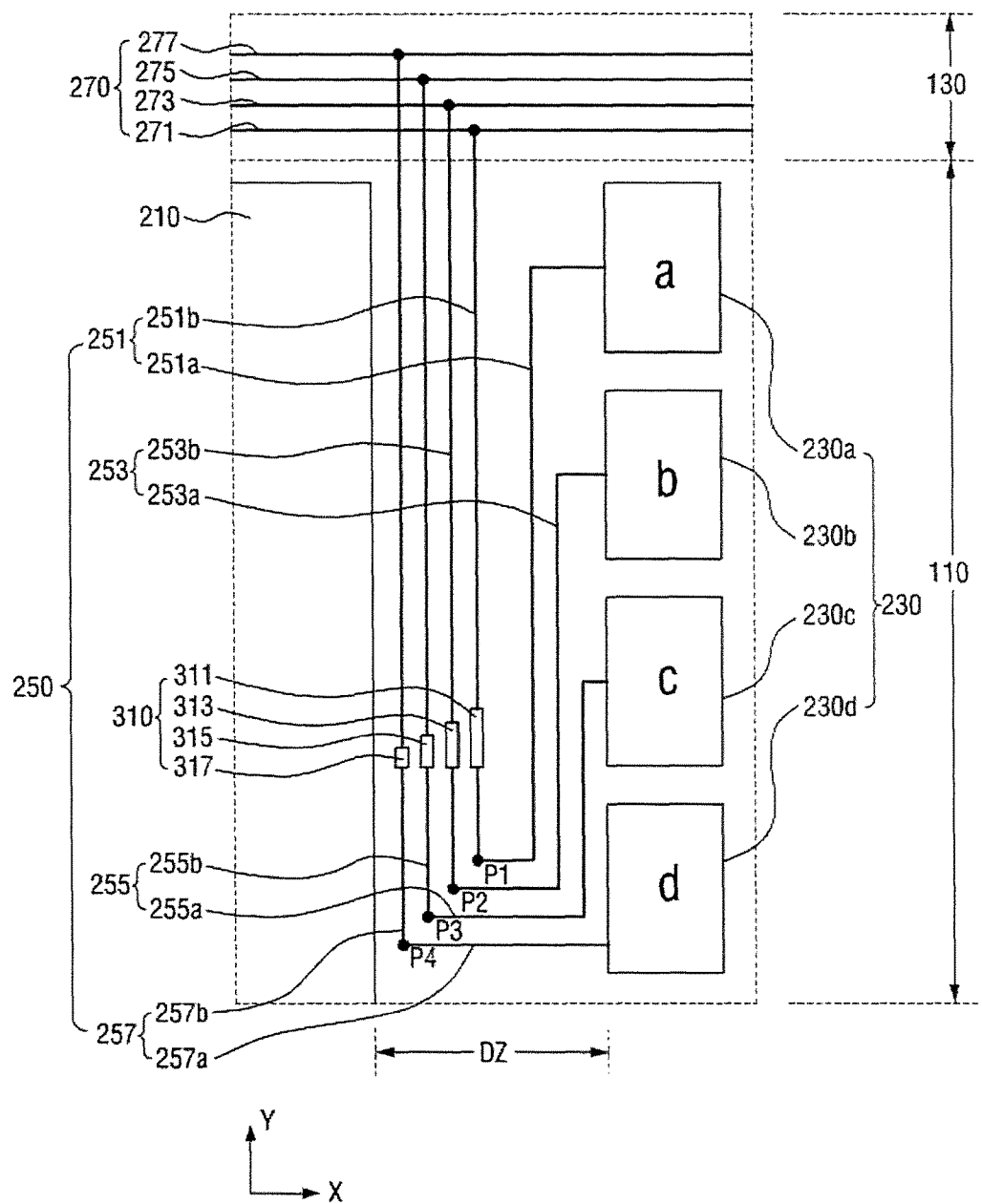
FIG. 6 is an enlarged view of part of the touch sensing device illustrated in FIG. 5.

FIG. 5 is a plan view illustrating a planar structure of a touch sensing device according to another exemplary embodiment, and FIG. 6 is an enlarged view of part of the touch sensing device illustrated in FIG. 5, and particularly, portion A of FIG. 5. The touch sensing device of FIGS. 5 and 6 is almost the same as the touch sensing device of FIG. 2 except that it further includes a plurality of capacitor electrodes. Accordingly, the touch sensing device of FIGS. 5 and 6 will hereinafter be described, focusing mainly on differences with the touch sensing device of FIGS. 2 to 4B.

Referring to FIGS. 5 and 6, a touch sensing device according to another exemplary embodiment may include a plurality of capacitor electrodes 310 for compensating for an RC delay.

More specifically, the capacitor electrodes 310 may compensate for RC delay variations that may be caused by differences in length between a plurality of internal interconnections 250.

The capacitor electrodes 310 may be provided in a touch sensing region 110. To compensate for variations in RC delays between the internal interconnections 250, the capacitor electrodes 310 may form a plurality of capacitors together with the internal interconnections 250. By adjusting the overlapping areas of the capacitor electrodes 310 and the internal interconnections 250, the capacitance of the capacitor electrodes 310 may be controlled, and as a result, RC delays in the internal interconnections 250 may become uniform.

The capacitor electrodes 310 may be arranged to overlap with the internal interconnections 250. In an exemplary embodiment, the capacitor electrodes 310 may be disposed above or below the internal interconnections 250.

The capacitor electrodes 310 may be insulated from the internal interconnections 250.

In an exemplary embodiment, the capacitor electrodes 310 may be floating electrodes. That is, no particular voltages may be supplied to the capacitor electrodes 310.

The capacitor electrodes 310 may be formed of a conductive material. In an exemplary embodiment, the capacitor electrodes 310 may be optically transparent. The capacitor electrodes 310 may be formed of a transparent conductive oxide such as ITO, IZO, or ZO, a conductive material such as a carbon nanomaterial, nanowire, or a conductive polymer, a metal particle or metal in the form of a thin film or a mesh, or any combination thereof.

The capacitor electrodes 310 may be provided in dead zones DZ in the touch sensing region 110, and may overlap with the internal interconnections 250.

For convenience, a capacitor electrode 310 overlapping with a first internal interconnection 251, a capacitor electrode 310 overlapping with a second internal interconnection 253, a capacitor electrode 310 overlapping with a third internal interconnection 255, and a capacitor electrode 310 overlapping with a fourth internal interconnection 257 will hereinafter be referred to as first, second, third, and fourth capacitor electrodes 311, 313, 315, and 317, respectively.

The first, second, third, and fourth capacitor electrodes 311, 313, 315, and 317 may be physically isolated from one another, and may be electrically insulated from one another.

In a case in which the first, second, third, and fourth internal interconnections 251, 253, 255, and 257 have the same width and the first internal interconnection 251 is shorter than the second internal interconnection 253, resistance R1 of the first internal interconnection 251 may be lower than resistance R2 of the second internal interconnection 253, i.e., R1<R2. In this case, to compensate for RC delay variations, capacitance C1 between the first capacitor electrode 311 and the first internal interconnection 251 may need to be greater than capacitance C2 between the second capacitor electrode 313 and the second internal interconnection 253. That is, to reduce the RC delay variations, the capacitance C1 and the capacitance C2 may need to satisfy the following inequality: C1>C2. Accordingly, the overlapping area of the first capacitor electrode 311 and the first internal interconnection 251 may be larger than the overlapping area of the second capacitor electrode 313 and the second internal interconnection 253. In other words, the overlapping areas of the first, second, third, and fourth capacitor electrodes 311, 313, 315 and 317 and the first, second, third, and fourth internal interconnections 251, 253, 255, and 257 may be inversely proportional to the lengths of the first, second, third, and fourth internal interconnections 251, 253, 255, and 257, respectively.

There is nearly no restriction on the shape of the first, second, third, and fourth capacitor electrodes 311, 313, 315, and 317. The first, second, third, and fourth capacitor electrodes 311, 313, 315, and 317 are illustrated in FIGS. 5 and 6 as being rectangular, but the inventive concept is not limited thereto. That is, the first, second, third, and fourth capacitor electrodes 311, 313, 315, and 317 may be formed in various other shapes such as a polygonal shape, a semicircular shape, a circular shape or a combination thereof. The first, second, third, and fourth capacitor electrodes 311, 313, 315, and 317 may have different shapes from one another. In FIGS. 5 and 6, there is only one capacitor electrode 310 (i.e., the first capacitor electrode 311) overlapping with only one internal interconnection (i.e., the first internal interconnection 251), but the inventive concept is not limited thereto. That is, more than one capacitor may be provided overlapping with their respective internal interconnections.

The internal interconnections 250, like the internal interconnections 250 of FIGS. 2 and 3, may each include a detour portion and a main portion, as illustrated in FIGS. 5 and 6.

More specifically, the first, second, third, and fourth internal interconnections 251, 253, 255, and 257 may include detour portions 251a, 253a, 255a, and 257a, respectively, which at least partially extend away from an external interconnection region 130, and main portions 251b, 253b, 255b and 257b, respectively, which extend toward the external interconnection region 130. In this exemplary embodiment, RC delay variations between the first, second, third, and fourth internal interconnections 251, 253, 255, and 257 may be minimized by adjusting the resistances of the first, second, third, and fourth internal interconnections 251, 253, 255, and 257 and the capacitances between the first, second, third, and fourth internal interconnections 251, 253, 255, and 257 and the first, second, third, and fourth capacitor electrodes 311, 313, 315, and 317.

Figure 7:
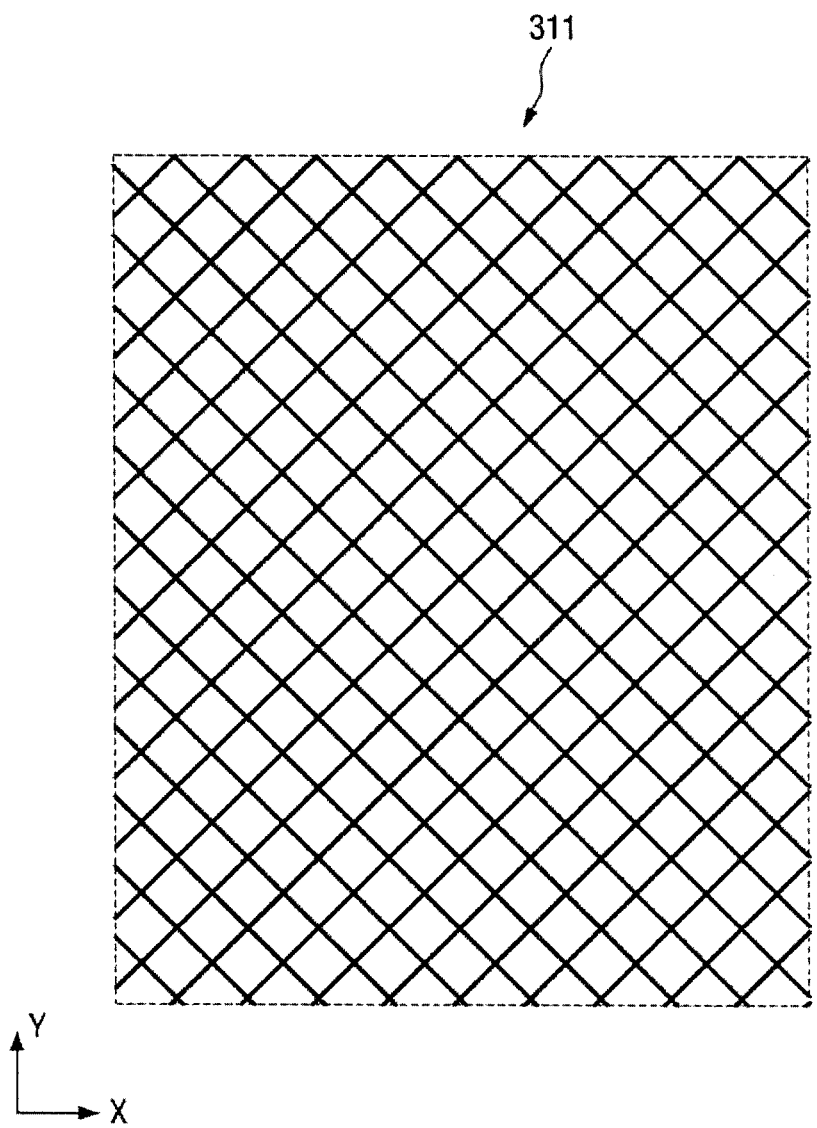
FIG. 7 is an enlarged view of a capacitor electrode illustrated in FIG. 6.

FIG. 7 is an enlarged view of a capacitor electrode illustrated in FIG. 6, and particularly, the first capacitor electrode 311.

Referring to FIG. 7, the first capacitor electrode 311 may be formed in a mesh form including a stack of a plurality of metal lines extending in one diagonal direction with respect to the first direction (or the Y-axis direction) and a plurality of metal lines extending in another diagonal direction with respect to the first direction to intersect the former plurality of metal lines. In this exemplary embodiment, even if the first capacitor electrode 311 is disposed to overlap with an internal interconnection, it is possible to prevent the occurrence of a moire phenomenon that may be caused by interference.

Figure 8:
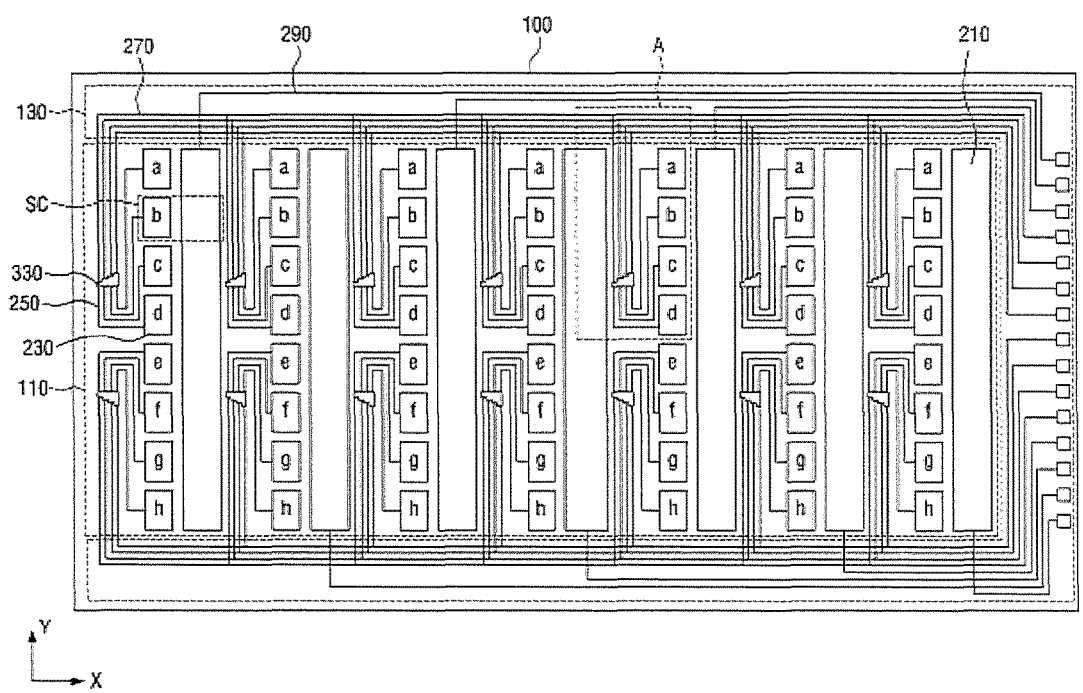
FIG. 8 is a plan view illustrating a planar structure of a touch sensing device according to another exemplary embodiment.
Figure 9:
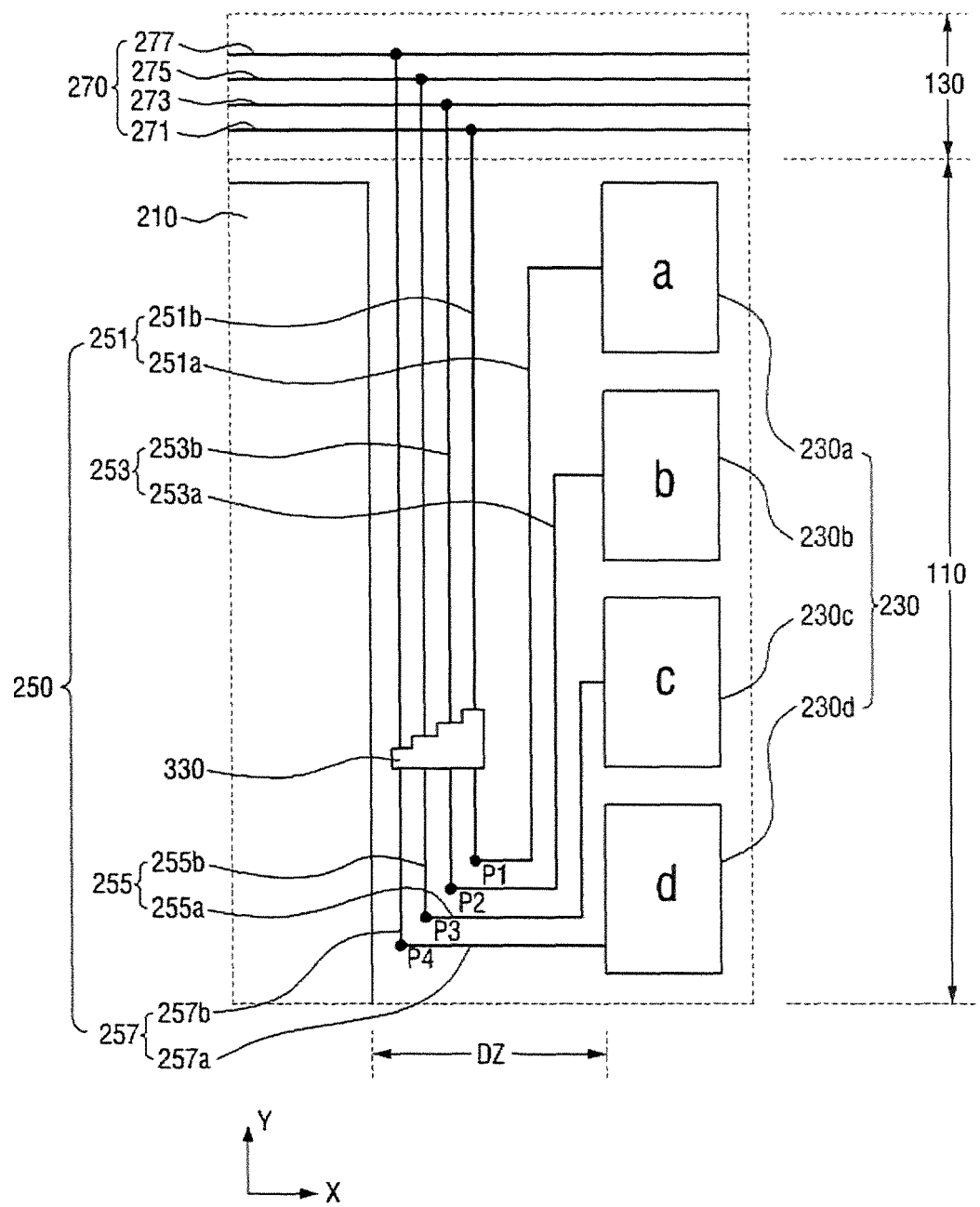
FIG. 9 is an enlarged view of part of the touch sensing device illustrated in FIG. 8.

FIG. 8 is a plan view illustrating a planar structure of a touch sensing device according to another exemplary embodiment, and FIG. 9 is an enlarged view of part of the touch sensing device illustrated in FIG. 8, and particularly, portion A of FIG. 8.

The touch sensing device of FIGS. 8 and 9 differs from the touch sensing device of FIGS. 5 and 6 in that capacitor electrodes 330, which are each formed in one piece, may be provided in each dead zone DZ to overlap with more than one internal interconnection 250, respectively.

That is, as illustrated in FIG. 9, a capacitor electrode 330 may be formed in one piece, and the overlapping areas of the capacitor electrode 330 and first, second, third, and fourth internal interconnections 251, 253, 255, and 257 may differ from one another. More specifically, the overlapping areas of the capacitor electrode 330 and the first, second, third, and fourth internal interconnections 251, 253, 255, and 257 may be inversely proportional to the lengths of the first, second, third, and fourth internal interconnections 251, 253, 255, and 257, respectively.

The rest of the touch sensing device of FIGS. 8 and 9 is the same as, or at least similar to, the touch sensing device of FIGS. 5 and 6, and thus, detailed descriptions thereof will be omitted.

Figure 10:
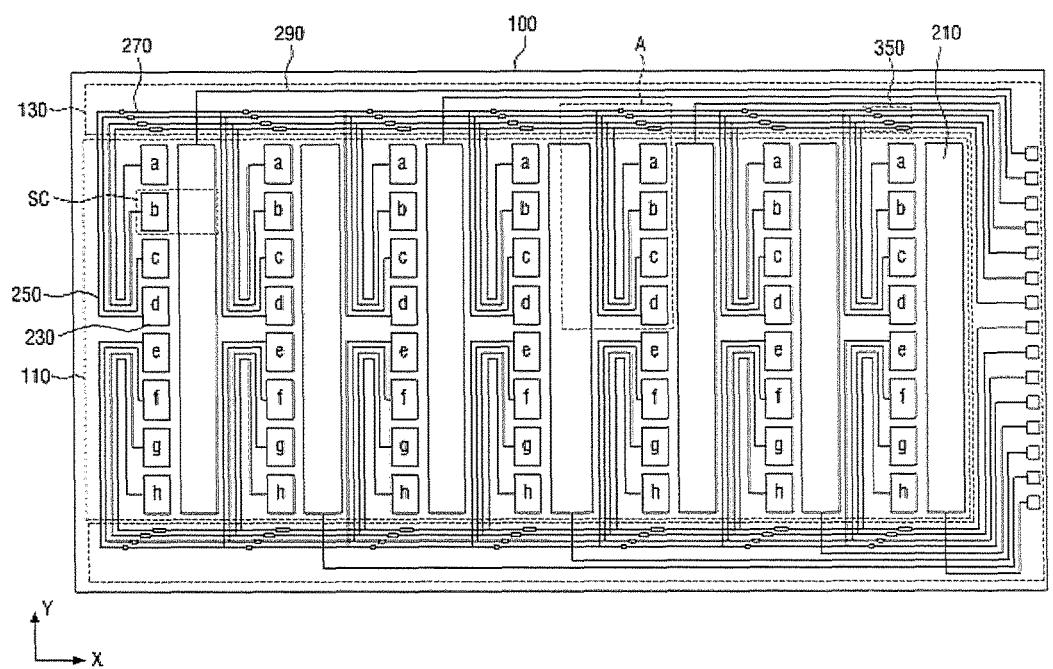
FIG. 10 is a plan view illustrating a planar structure of a touch sensing device according to another exemplary embodiment.
Figure 11:
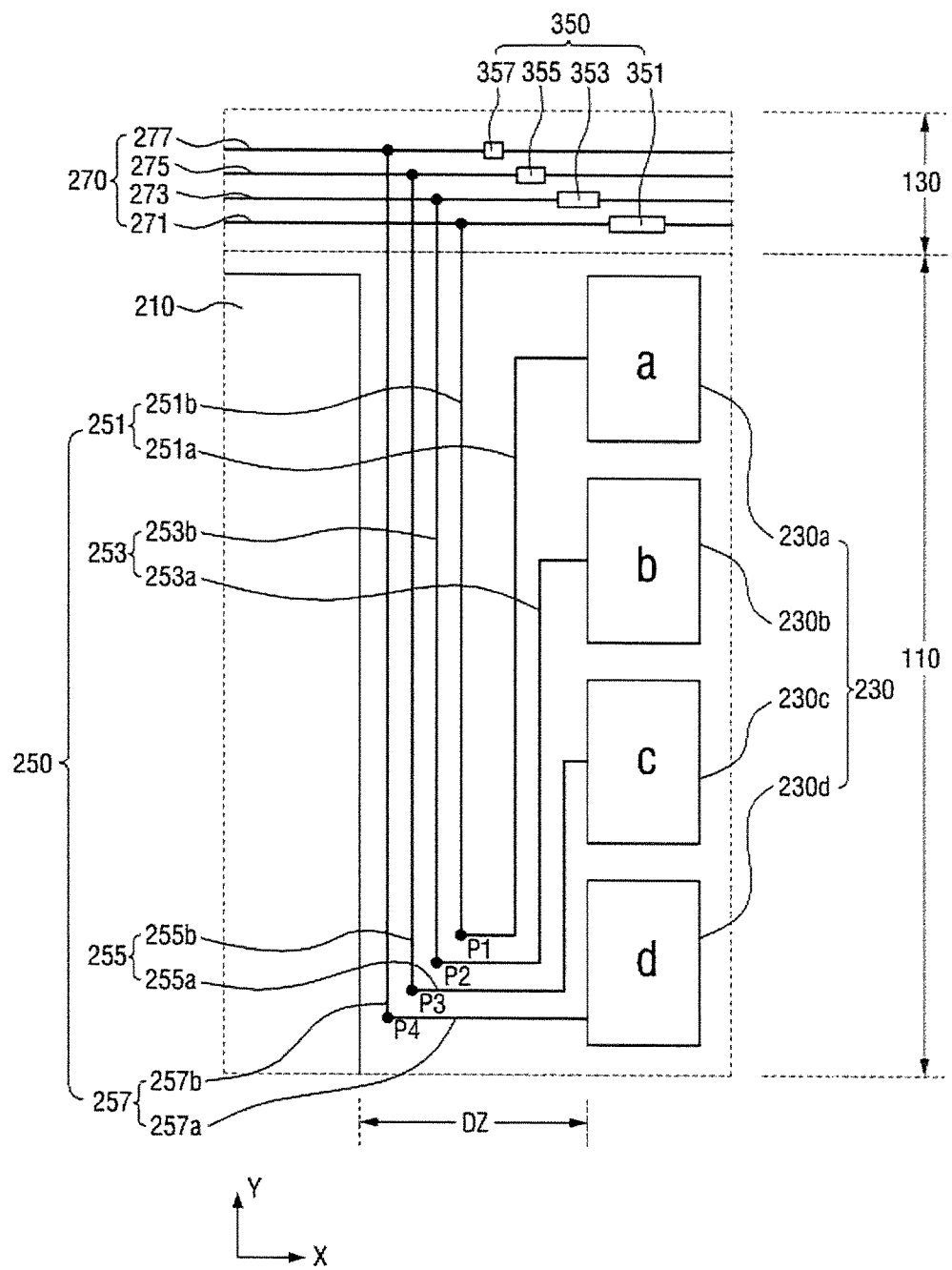
FIG. 11 is an enlarged view of part of the touch sensing device illustrated in FIG. 10.

FIG. 10 is a plan view illustrating a planar structure of a touch sensing device according to another exemplary embodiment, and FIG. 11 is an enlarged view of part of the touch sensing device illustrated in FIG. 10, and particularly, portion A of FIG. 10.

The touch sensing device of FIGS. 10 and 11 differs from the touch sensing device of FIGS. 5 and 6 in terms of the location in which to form a plurality of capacitor electrodes. The rest of the touch sensing device of FIGS. 10 and 11 is the same as, or at least similar to, the touch sensing device of FIGS. 5 and 6, and thus, the touch sensing device of FIGS. 10 and 11 will hereinafter be described, focusing mainly on differences with the touch sensing device of FIGS. 5 and 6.

In the touch sensing device of FIGS. 10 and 11, unlike in the touch sensing device of FIGS. 5 and 6, a plurality of capacitor electrodes 350 may be additionally provided in an external interconnection region 130 to overlap with a plurality of first external interconnections 270, respectively.

The capacitor electrodes 350 may compensate for RC delay variations that may be caused by differences in length between a plurality of internal interconnections 250 and RC delay variations that may be caused by differences in location between the connecting nodes between the internal interconnections 250 and the first external interconnections 270.

The capacitor electrodes 350 may be provided in the external interconnection region 130, and may form a plurality of capacitors together with the first external interconnections 270. By adjusting the overlapping areas of the first external interconnections 270 and the capacitor electrodes 350, the capacitance of the capacitor electrodes 350 may be adjusted, and as a result, RC delays may become uniform.

The capacitor electrodes 350 may be disposed to overlap with the first external interconnections 270, respectively. In an exemplary embodiment, the capacitor electrodes 350 may be disposed above or below the first external interconnections 270.

The capacitor electrodes 350 may be insulated from the first external interconnections 270.

In an exemplary embodiment, the capacitor electrodes 350 may be floating electrodes. That is, no particular voltages may be supplied to the capacitor electrodes 350.

For convenience, a capacitor electrode 350 overlapping with a first sub-external interconnection 271, which is connected to a first internal interconnection 251, a capacitor electrode 350 overlapping with a second sub-external interconnection 273, which is connected to a second internal interconnection 253, a capacitor electrode 350 overlapping with a third sub-external interconnection 275, which is connected to a third internal interconnection 255, and a capacitor electrode 350 overlapping with a fourth sub-external interconnection 277, which is connected to a fourth internal interconnection 257, will hereinafter be referred to as first, second, third, and fourth capacitor electrodes 351, 353, 355, and 357, respectively.

The first, second, third, and fourth capacitor electrodes 351, 353, 355, and 357 may be physically isolated from one another, and may be electrically insulated from one another.

In a case in which the first, second, third, and fourth internal interconnections 251, 253, 255, and 257 have the same width and the first internal interconnection 251 is shorter than the second is internal interconnection 253, resistance R1 of the first internal interconnection 251 may be lower than resistance R2 of the second internal interconnection 253, i.e., R1<R2. In this case, variations in RC delays among the first, second, third, and fourth internal interconnections 251, 253, 255, and 257 may occur during the transmission of signals via the first, second, third, and fourth internal interconnections 251, 253, 255, and 257. To compensate for the RC delay variations, capacitance C3 between the first capacitor electrode 351 and the first sub-external interconnection 271 may need to be greater than capacitance C4 between the second capacitor electrode 353 and the second sub-external interconnection 273. That is, to reduce the RC delay variations, the capacitance C3 and the capacitance C4 may need to satisfy the following inequality: C3>C4. Accordingly, the overlapping area of the first capacitor electrode 351 and the first sub-external interconnection 271 may be larger than the overlapping area of the second capacitor electrode 353 and the second sub-external interconnection 273. In other words, the overlapping areas of the first, second, third, and fourth capacitor electrodes 351, 353, 355 and 357 and the first, second, third, and fourth sub-external interconnections 271, 273, 275, and 277 may be inversely proportional to the lengths of the first, second, third, and fourth internal interconnections 251, 253, 255, and 257, respectively.

In an alternative exemplary embodiment to that illustrated in FIGS. 10 and 11, the capacitor electrodes 350 may each be formed in one piece in a similar manner to the capacitor electrodes 330 of FIGS. 8 and 9 to overlap with more than one first external interconnection 270. In this exemplary embodiment, the overlapping areas of a capacitor electrode 350 and the first, second, third, and fourth sub-external interconnections 271, 273, 275, and 277 may differ from one another. More specifically, the overlapping areas of the capacitor electrode 350 and first, second, third, and fourth sub-external interconnections 271, 273, 275, and 277 may be inversely proportional to the lengths of the first, second, third, and fourth internal interconnections 251, 253, 255, and 257, respectively.

The internal interconnections 250, like the internal interconnections 250 of FIGS. 10 and 11, may each include a detour portion and a main portion, as illustrated in FIGS. 10 and 11.

More specifically, the first, second, third, and fourth internal interconnections 251, 253, 255, and 257 may include detour portions 251a, 253a, 255a, and 257a, respectively, which at least partially extend away from the external interconnection region 130, and main portions 251b, 253b, 255b and 257b, respectively, which extend toward the external interconnection region 130. In this exemplary embodiment, RC delay variations between the first, second, third, and fourth internal interconnections 251, 253, 255, and 257 may be minimized by adjusting the resistances of the first, second, third, and fourth internal interconnections 251, 253, 255, and 257 and the capacitances between the first, second, third, and fourth capacitor electrodes 351, 353, 355, and 357 and the first, second, third, and fourth sub-external interconnections 271, 273, 275, and 277.

In an alternative exemplary embodiment to that illustrated in FIGS. 10 and 11, the touch sensing device may also include a plurality of capacitor electrodes 310, which are formed above the internal interconnections 250, as illustrated in FIGS. 5 and 6.

While the inventive concept has been particularly shown and described with reference to exemplary embodiments thereof, it will be understood by those of ordinary skill in the art that various changes in provide and detail may be made therein without departing from the spirit and scope of the inventive concept as defined by the following claims. The exemplary embodiments should be considered in a descriptive sense only and not for purposes of limitation.

What is claimed is:

1. A touch sensing device, comprising:
   an external interconnection region in which a plurality of external interconnections are disposed;
   a plurality of patch electrodes configured to be arranged in a first direction away from the external interconnection region, the patch electrodes comprising a first patch electrode and a second patch electrode, the second patch electrode being further apart than the first patch electrode from the external interconnection region; and
   a plurality of internal interconnections configured to be disposed in a dead zone, which is defined on one side of the patch electrodes, the internal interconnections having first ends connected to the patch electrodes, respectively, and second ends connected to one of the external interconnections,
   wherein each of the internal interconnections includes a detour portion, at least one of which at least partially extends away from the external interconnection region, and a main portion, which extends toward the external interconnection region, and the detour portion of a first internal interconnection connected to the first patch electrode is longer than the detour portion of a second internal interconnection connected to the second patch electrode, the detour portion of the first internal interconnection comprising:
   a first straight line section directly connected to the first patch electrode;
   a second straight line section, wherein the first straight line section and the second straight line section extend in a second direction perpendicular to the first direction; and
   a third straight line section extending from the first straight line section in the first direction away from the external interconnection region to the second straight line section.

2. The touch sensing device of claim 1, wherein the main portion of the second internal interconnection is longer than the main portion of the first internal interconnection.

3. The touch sensing device of claim 2, wherein the first internal interconnection and the second internal interconnection have the same length.

4. The touch sensing device of claim 1, wherein the internal interconnections comprise connecting nodes between the main portions and the detour portions of the internal interconnections, the connection nodes being disposed where the internal interconnections become most distant from the external interconnection region.

5. The touch sensing device of claim 1, wherein at least one of the detour portions of the internal interconnections includes at least one bent section.

6. The touch sensing device of claim 1, further comprising:
   one or more capacitor electrodes configured to be insulated from, and overlap with the internal interconnections.

7. The touch sensing device of claim 6, wherein the capacitor electrodes are floating electrodes.

8. The touch sensing device of claim 6, wherein the capacitor electrodes are each formed in a mesh form.

9. The touch sensing device of claim 6, wherein the capacitor electrodes include a first capacitor electrode overlapping with the first internal interconnection and a second capacitor electrode overlapping with the second internal interconnection, and an overlapping area of the first internal interconnection and the first capacitor electrode differs from an overlapping area of the second internal interconnection and the second capacitor electrode.

10. The touch sensing device of claim 6, wherein more than one capacitor electrode is provided and is electrically insulated from each other.

11. The touch sensing device of claim 6, wherein the capacitor electrodes are formed in one body with each other.

12. The touch sensing device of claim 1, further comprising:
   one or more capacitor electrodes configured to be insulated from, and overlap with, the external interconnections.

13. The touch sensing device of claim 1, wherein each of the internal interconnections includes one or more bent sections.

14. The touch sensing device of claim 13, wherein at least one of the internal interconnections is formed in a mesh form.

15. A touch sensing device, comprising:
   an external interconnection region in which a plurality of external interconnections are disposed;
   a plurality of patch electrodes configured to be arranged in a first direction away from the external interconnection region;
   a plurality of internal interconnections configured to be disposed in a dead zone, which is defined on one side of the patch electrodes, the internal interconnections having first ends connected to the patch electrodes, respectively, and second ends to one of the external interconnections, wherein a detour portion of a first internal interconnection of the internal interconnections comprises:
a first straight line section directly connected to a first patch electrode of the patch electrodes;
a second straight line section, wherein the first straight line section and the second straight line section extend in a second direction perpendicular to the first direction; and
a third straight line section extending from the first straight line section in the first direction away from the external interconnection region to the second straight line section; and
one or more capacitor electrodes configured to be insulated from, and overlap with the internal interconnections.

16. The touch sensing device of claim 15, wherein the capacitor electrodes are floating electrodes.

17. The touch sensing device of claim 15, wherein the capacitor electrodes are each formed in a mesh form.

18. A touch sensing device, comprising:
an external interconnection region in which a plurality of external interconnections are disposed;
a plurality of patch electrodes configured to be arranged in a first direction away from the external interconnection region;
a plurality of internal interconnections configured to be disposed in a dead zone, which is defined on one side of the patch electrodes, the internal interconnections having first ends connected to the patch electrodes, respectively, and second ends to one of the external interconnections, wherein a detour portion of a first internal interconnection of the internal interconnections comprises:
a first straight line section directly connected to a first patch electrode of the patch electrodes;
a second straight line section, wherein the first straight line section and the second straight line section extend in a second direction perpendicular to the first direction; and
a third straight line section extending from the first straight line section in the first direction away from the external interconnection region to the second straight line section; and
one or more capacitor electrodes configured to be insulated from, and overlap with the external interconnections.

19. The touch sensing device of claim 18, wherein the capacitor electrodes are floating electrodes.

20. The touch sensing device of claim 18, wherein the capacitor electrodes are each formed in a mesh form.

* * * * *